United States Patent
Adams et al.

[19]

[11] Patent Number: 6,009,611
[45] Date of Patent: Jan. 4, 2000

[54] METHOD FOR DETECTING WEAR AT CONNECTIONS BETWEEN PIN AND BOX JOINTS

[75] Inventors: Burt A. Adams; Christopher P. Bourgeois; Robert L. Hatcher, Jr., all of Morgan City, La.

[73] Assignee: Oil & Gas Rental Services, Inc., New Orleans, La.

[21] Appl. No.: 09/159,939

[22] Filed: Sep. 24, 1998

[51] Int. Cl.[7] .............................. B21D 39/00; F16L 35/00
[52] U.S. Cl. ......................... 29/407.01; 29/456; 285/93; 285/333
[58] Field of Search .................. 29/407.01, 456; 285/93, 333, 334; 411/8, 9, 10; 73/761

[56] References Cited

U.S. PATENT DOCUMENTS

| | | | |
|---|---|---|---|
| Re. 34,467 | 12/1993 | Reeves . | |
| 3,468,563 | 9/1969 | Duret | 285/334 |
| 4,127,927 | 12/1978 | Hauk et al. | 285/93 |
| 4,161,332 | 7/1979 | Blose . | |
| 4,192,533 | 3/1980 | Blose . | |
| 4,317,585 | 3/1982 | Boice | 285/93 |
| 4,438,953 | 3/1984 | Timme | 285/93 |
| 4,444,421 | 4/1984 | Ahlstone | 285/93 |
| 4,614,120 | 9/1986 | Fradin et al. | 73/761 |
| 4,700,576 | 10/1987 | Grare et al. | 73/761 |
| 4,703,954 | 11/1987 | Ortloff et al. . | |
| 4,712,815 | 12/1987 | Reeves . | |
| 4,762,344 | 8/1988 | Perkins et al. | 285/333 |
| 5,015,132 | 5/1991 | Turner et al. | 411/10 |
| 5,454,605 | 10/1995 | Mott . | |
| 5,794,985 | 8/1998 | Mallis . | |

*Primary Examiner*—Lee W. Young
*Assistant Examiner*—A. Dexter Tugbang
*Attorney, Agent, or Firm*—Garvey, Smith, Nehrbass & Doody, LLC

[57] ABSTRACT

A method of detecting thread wear for drill pipe and drill casing that are connectable end-to-end at threaded joint connections includes the providing of a pair of pipe joints to be joined coming each having end portions with threads that engage upon assembly. A projection is place on a first of the pipe joints near the joint end portion, the projection facing a second pipe joint during assembly of the pair of pipe joints. The joints are connected together and observed after assembly to determine weather or not the projection has become mechanically deformed or has scratched the surface of the opposing joint to thereby indicating worn condition of the threads.

24 Claims, 4 Drawing Sheets

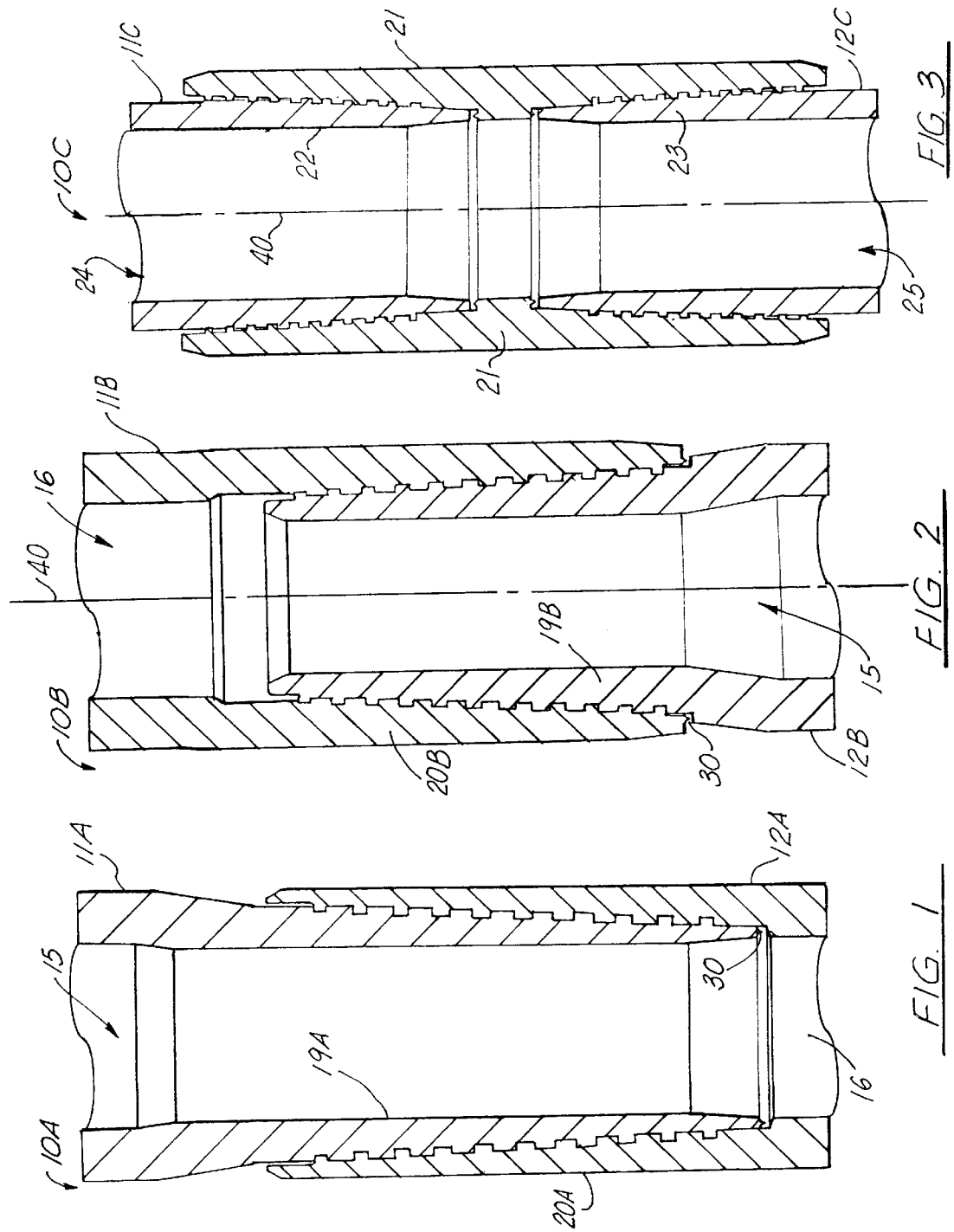

METHOD FOR DETECTING WEAR AT CONNECTIONS BETWEEN PIN AND BOX JOINTS

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to thread connected pipe joints such as those used in the oil and gas well industry including for example oil well tubing, casing, line pipe and drill pipe (all of which will be referred to hereinafter as "pipe" or "pipe joints"). Even more particularly, the present invention relates to an improved method and apparatus for detecting wear at pin and box joints that can include dovetail, wedge and/or taper type thread connections.

2. General Background of the Invention

In the oil and gas well drilling industry and in the production of oil and gas, it is common to employ a number of joints of pipe that are connected end-to-end for purposes of communicating with oil and gas that is contained deep in the earth. These lengths of pipe can be used for drilling and/or production purposes.

For many years, oil well drill pipe and like pipe joints used a standard pin and box connection that included transverse faces or annular shoulders that would engage upon assembly of a pair of joints. These abutting faces created a seal.

Recently, pin and box type connections and similar type connections have been developed that form a seal with the interlocking threads of the pin and box connections. In such a situation, because the pin and box threads form a seal, there is no need for abutting annular shoulders, transverse faces or annular faces to form a seal. Indeed, the transverse end portions or stand-off surfaces of the joints do not touch unless the threads are badly worn.

One of the problems facing a user of such pipe joints is that the wear can be very gradual. It is important that the operator know when the wear has reached a level requiring replacement.

A number of patents have issued for pin and box type connections that use threaded connections such as dovetail, wedge threads, taper threads and the like. Some of these patents disclose stand off surfaces, i.e., any two transverse surfaces that are spaced apart upon assembly. An example of such a patent is the Blose patent 4,161,332, entitled "Dovetail Connection for Pin and Box Joints". In the Blose '332 patent, a pipe joint includes pin and box members having interengaged two step threads and interengaged annular shoulders preventing radial and axial separation of the members.

The Blose patent 4,192,533 discloses a pipe joint pin and box connection wherein the pin and box member have interengagable two step threads and interengagable annular shoulders for preventing radial and axial separation of the members.

The Ortloff patent 4,703,954 discloses a threaded pipe connection of the wedge shaped thread type that avoids high stress concentrations in the box between the first thread and the end of the box by making the length of the box between the first thread and the end of the box equal to or greater than 5% of the pipe diameter and by providing clearance between the crest of the first full thread on the box and the root of the last thread on the pin and between the crest of the last full thread on the pin and the root of the first full thread on the box.

A metal-to-metal wedge thread coupling connector is the subject of the Reeves patent 4,712,815.

The Mott patent 5,454,605 discloses a tubular connection having interlocking wedge threads. A threaded pipe connection that discloses a coupling used to join two pin members is the subject of U.S. Pat. No. 5,794,985. A reissue of the Reeves '409 patent is reissue patent 34,467, entitled "Tubular Connection".

BRIEF SUMMARY OF THE INVENTION

The present invention provides a method of detecting thread wear for pipe joints that are connectable end-to-end and which use wedge threads, tapered threads, dovetail threads, and the like. The present invention provides a pair of pipe joints to be joined, each joint having end portions with threaded sections that connect to similarly threaded sections of the other joint.

A projection is placed on a first of the pipe joints near the joint end portion, the projection facing a second pipe joint during assembly of the pair of pipe joints.

The joints of pipe are connected together, wherein transverse faces of the two joints are spaced apart upon connection when the threaded portions are not unduly worn.

A user observes the joints of pipe after assembly at the projection to determine whether or not the projection has become worn, or has marked the second joint of pipe. If in fact the projection has become worn or has marked the second joint of pipe, such indicates a worn condition of the threads in that the transverse faces of the respective joints have moved too close in proximity. This observation can be made when the joints have been disassembled or, when still assembled, if the projection is mounted on an external transverse face, such as shown in FIG. 7.

A worn condition is thus present if the projection extends to and engages a transverse face of the second joint of pipe, marking, scoring or deforming the projection and/or the transverse face of the second joint of pipe.

If in fact the projection has scored the second joint of pipe or marked the second joint of pipe, such a mark or score will be visible to the inspector and the presence of a worn condition can then be visually confirmed.

The transverse surfaces on the respective joints can be in the form of annular shoulders, transverse faces, bevelled faces or other end portions of pin and box type connections that are typically at the end of the threaded section of the pin and box members.

BRIEF DESCRIPTION OF THE DRAWINGS

FIG. 1 is an elevational view of a first embodiment of the apparatus of the present invention;

FIG. 2 is a sectional elevational view of a second embodiment of the apparatus of the present invention;

FIG. 3 is a sectional elevational view of a third embodiment of the apparatus of the present invention;

For a further understanding of the nature, objects, and advantages of the present invention, reference should be had to the following detailed description, read in conjunction with the following drawings, wherein like reference numerals denote like elements and wherein:

DETAILED DESCRIPTION OF THE INVENTION

FIGS. 1–8 show the preferred embodiment of the apparatus of the present invention in three slightly alternate configurations designated respectively as 10A, 10B, and 10C in FIGS. 1–3, and 6–7.

Thread wear indicator 10A is shown in FIG. 1. Indicator 10B is shown in FIG. 2 and 10C in FIG. 3. Each embodiment 10A, 10B and 10C includes a pair of connected joints of pipe. In FIG. 1, the joints include joint 11A and joint 12A. In FIG. 2, the joints include joint 11B and joint 12B. In FIG. 3, the joints include joint 11C and joint 12C that are joined by coupling 21.

Figure 5:
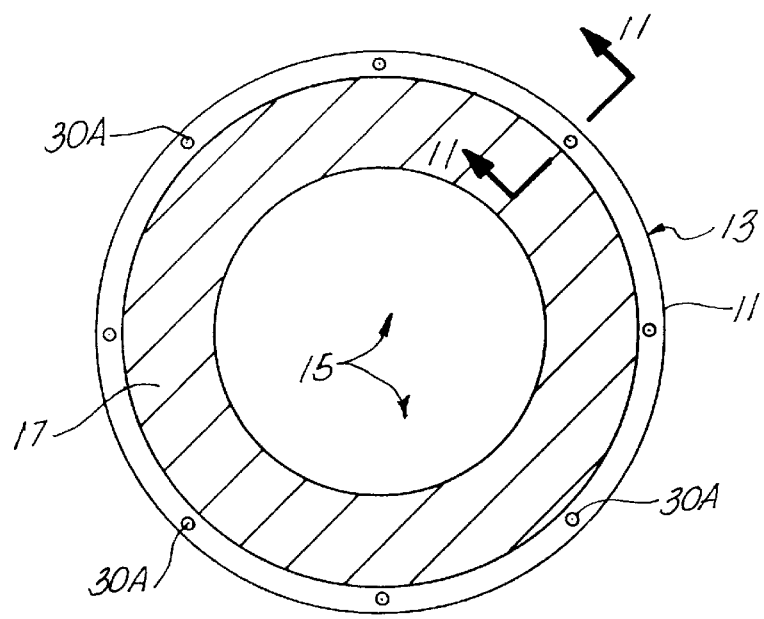
FIG. 5 is another transverse cut away view of an alternate embodiment of the apparatus of the present invention.
Figure 4:
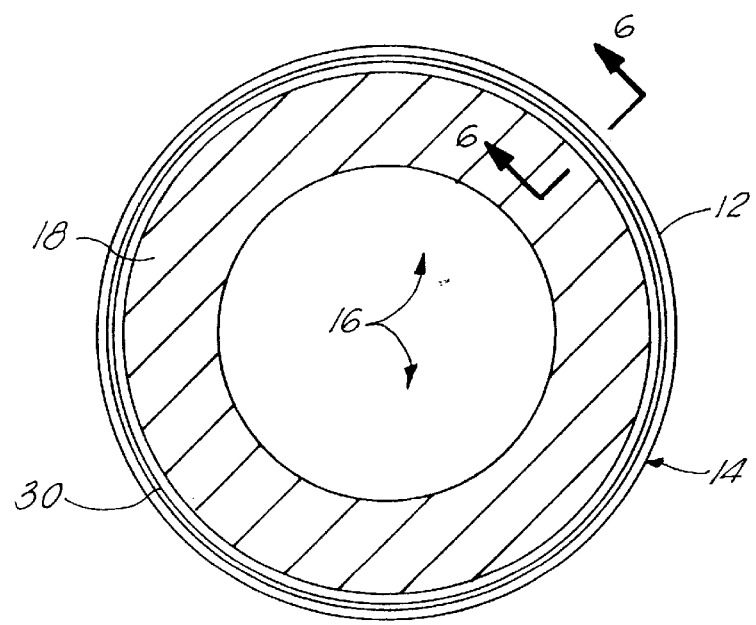
FIG. 4 is a transverse cut away view of the preferred embodiment of the apparatus of the present invention.

Each joint includes an outer surface 13 or 14 and an inner bore 15 or 16 as shown best in FIGS. 4 and 5. Each joint 11, 12 also includes a wall 17, 18 respectively (see FIGS. 4 and 5).

Figure 6:
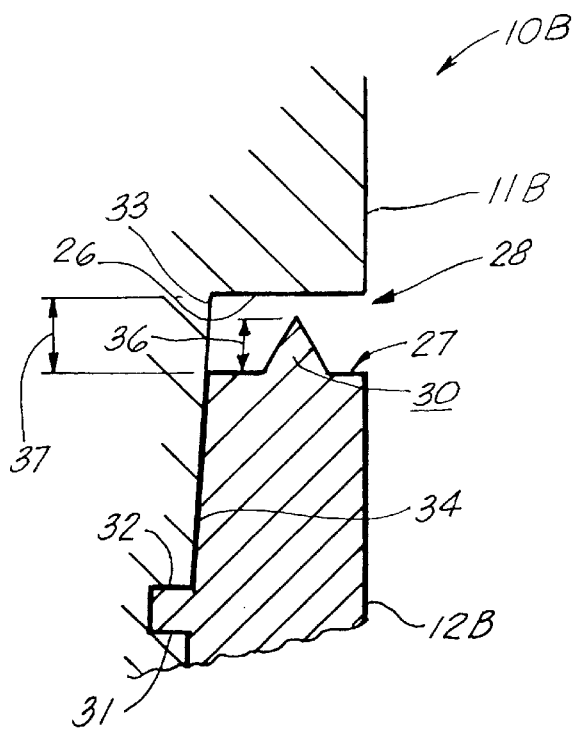
FIG. 6 is a fragmentary elevational view of the second embodiment of the apparatus of the present invention.
Figure 9:
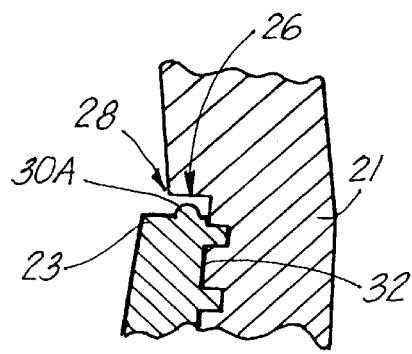
FIG. 9 is a sectional fragmentary elevational view of the first embodiment of the apparatus of the present invention and showing a projection that is hemispherically shaped.

The joints 11A, 11B, 11C, 12A, 12B, 12C can each provide pin and box end portions. In FIG. 1, the pin end is designated as 19A, the box end being designated as 20A. In FIG. 2, the pin end 19B is shown connected to box end 20B. In FIG. 3, a coupling 21 joins two pin end portions 22, 23. The joint 11C has a bore 24 and the joint 12C has a bore 25. In FIG. 6, each of the joints 11B, 12B can provide a transverse face 26 or 27. Such a transverse face 26, 27 can be in the form of an annular shoulder for example or a bevelled annular shoulder. "Transverse face" simply means that the surface or face 26, 27 forms an angle with a central longitudinal axis 40 of the flow bores 15, 16 or 24, 25 as shown in FIGS. 1, 2 and 3. In many situations, these transverse faces of separate joints are separated even after assembly, becoming stand off surfaces such as 26, 27 in FIG. 6. Further, these "stand off" surfaces can be internal or external. In FIGS. 1, 3 and 9, the "stand off" transverse surfaces are internal. In FIGS. 2, 6, 7 and 10, the transverse "stand off" surfaces 26, 27 are external of bore 15, 16.

Figure 7:
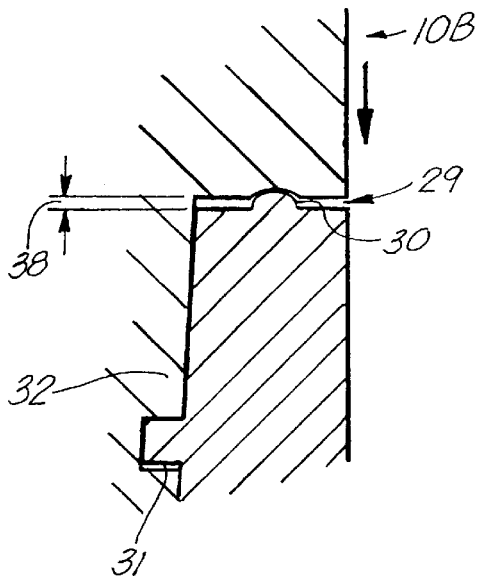
FIG. 7 is a fragmentary sectional elevational view of the second embodiment of the apparatus of the present invention when the interengaging threaded portions of the pipe joints are unduly worn.
Figure 8:
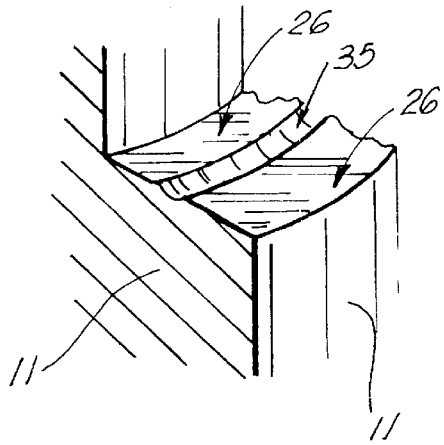
FIG. 8 is a partial perspective view of the preferred embodiment of the apparatus of the present invention showing a worn pipe joint after it has been marked or scored using the method and apparatus of the present invention.

When the connecting threads 31, 32 of a pair of connected joints 11A, 12A or 11B, 12B or 11C, 12C with coupling 21 are not unduly worn, a gap or space 28 extends between transverse faces 26, 27. This gap 28 is a proper gap when the distance 37 in between the surfaces 26, 27 is greater than the height or thickness of projection 30, 30A or 30B as shown by the arrow 36 in FIG. 6. If an unduly worn condition exists in the interengagable threads 31, 32, the gap 29 between transverse faces 26, 27 is reduced so that the gap 29, having a distance 38, is smaller than the height or thickness 36 of the projection 30. In such a situation, the projection 30, 30A and 30B engages transverse face 26 marking or scoring face 26 and/or deforming and flattening the projection 30, 30A and 30B, as shown in FIGS. 7 and 8. This observation can be made when the joints have been disassembled or, when still assembled, if the projection 30 is mounted on an external transverse face, such as shown in FIG. 7.

In FIG. 8, a score 35 is shown in face 26, said score occurring when a pair of joints 11A, 12A or 11B, 12B or 11C, 12C with coupling 21 have been joined and the threads 31, 32 are unduly worn. The score 35 would be visible because as the user rotates the two joints relative to one another during assembly, the projection 30 engages the face 26 marking or cutting it to produce the score 35 shown in FIG. 8. The projection 30, 30A and 30B would typically also show wear and/or a flattening or deformation under such circumstances.

As shown in FIG. 5, the projection 30, 30A or 30B can be in the form of a single or multiple separate projections. As shown in FIG. 4, the projection 30, 30A or 30B can be in the form of an annular projection extending 360 degrees. The cross section of the projection 30, 30A or 30B can be triangular (FIGS. 6,10,13) or hemispherical (FIG. 11) or rectangular (FIG. 12) as examples.

Figure 10:
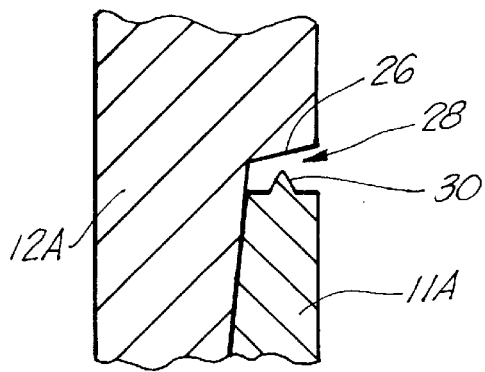
FIG. 10 is a partial sectional elevational view of the first embodiment of the apparatus of the present invention and showing a projection that is conically shaped.

In FIG. 9 and 10, the gap 28 is of a proper size upon assembly of the pipe sections so that the projection 30, 30A, 30B does not engage transverse face 26 of joint 12A or transverse face 26 of joint 21.

Figure 11:
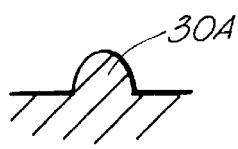
FIG. 11 is a fragmentary view illustrating a hemispherically shaped projection taken along lines 11—11 in FIG. 5.
Figure 12:
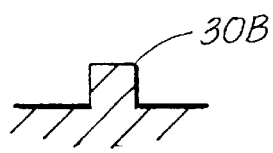
FIG. 12 is a fragmentary view illustrating a cylindrically shaped projection.
Figure 13:
FIG. 13 is a fragmentary view illustrating a conically shaped projection.

FIGS. 11–13 illustrate different configurations for the projections including a cone shaped projection 30 as shown in FIGS. 6, 7, 10 and 13 or a hemispherically shaped projection 30A in FIGS. 9 and 11. FIG. 12 shows a cylindrically shaped projection 30B.

The method and apparatus of the present invention can be used with any type of wedge thread or dovetail thread or taper thread such as those shown in one or more of the following patents, each of which is incorporated herein by reference:

4,161,332; 4,712,815; 4,703,954; 5,794,985; and Re. 34,467

The following table lists the parts numbers and parts descriptions as used herein and in the drawings attached hereto.

| PARTS LIST | |
| --- | --- |
| Part Number | Description |
| 10A | thread wear indicator |
| 10B | thread wear indicator |
| 10C | thread wear indicator |

-continued

PARTS LIST

| Part Number | Description |
|---|---|
| 11A | joint |
| 11B | joint |
| 11C | joint |
| 12A | joint |
| 12B | joint |
| 12C | joint |
| 13 | outer surface |
| 14 | outer surface |
| 15 | bore |
| 16 | bore |
| 17 | wall |
| 19 | wall |
| 19A | pin end |
| 19B | pin end |
| 20A | box end |
| 20B | box end |
| 21 | coupling |
| 22 | pin end |
| 23 | pin end |
| 24 | bore |
| 25 | bore |
| 26 | transverse surface |
| 27 | transverse surface |
| 28 | gap |
| 29 | gap |
| 30 | projection |
| 30A | projection |
| 30B | projection |
| 31 | threaded portion |
| 32 | threaded portion |
| 33 | annular curved surface |
| 34 | annular curved surface |
| 35 | score |
| 36 | distance |
| 37 | distance |
| 38 | distance |
| 40 | central axis |

The foregoing embodiments are presented by way of example only; the scope of the present invention is to be limited only by the following claims.

We claim:

1. A method of detecting thread wear for drill pipe sections that are connectable end-to-end at threaded pin and box joint connections, comprising the steps of:
   a) providing a pair of pipe joints to be joined, each joint having end portions with threaded portions that connect to similarly threaded portions of another joint;
   b) placing a projection on a first of the pipe joints near the joint end portion, said projection facing a second pipe joint during assembly of a pair of pipe joints;
   c) connecting the joints of pipe together, wherein said transverse faces are spaced apart upon said connection if said threaded portions are not unduly worn;
   d) observing the joints of pipe after assembly at the projection to determine whether or not one of the joints of pipe has become mechanically deformed at the projection, by the projection contacting the second joint of pipe to indicate a worn condition of the threads.

2. The method of claim 1 wherein in step "d" a worn thread condition is present if the projection extends to and engages the second joint of pipe.

3. The method of claim 1 wherein step "d" comprises observing the joints of pipe after assembly at the projection to determine whether or not the projection has scored the second joint of pipe to indicate a worn condition of the threads.

4. The method of claim 1 wherein step "b" comprises placing a metallic projection on a first of the pipe joints near the joint end portion, said metallic projection facing a second pipe joint during assembly of a pair of pipe joints.

5. The method of claim 1 wherein step "a" comprises providing a pair of pipe joints to be joined, each joint having end portions with threaded portions that connect to similarly threaded portions of another joint, said end portions including at least one end portion with a transverse flat face.

6. The method of claim 1 wherein step "a" comprises providing a pair of pipe joints to be joined, each joint having end portions with threaded portions that connect to similarly threaded portions of another joint, said end portions including at least one end portion with a transverse flat face, and step "d" comprises observing the joints of pipe after assembly at the projection to determine whether or not the projection has marked the second joint of pipe at the transverse face to indicate a worn condition of the threads.

7. The method of claim 1 further comprising the step of providing at least one of the joints of pipe with a flat annular surface at an end portion of the pipe joint and step "d" comprises observing the joints of pipe after assembly at the projection to determine whether or not the projection has marked the second joint of pipe at the flat annular surface to indicate a worn condition of the threads.

8. The method of claim 1 wherein step "a" comprises providing a pair of pipe joints to be joined, each joint having pin and box end portions with threaded portions that connect to similarly threaded portions of another joint.

9. The method of claim 1 wherein step "a" comprises providing a pair of pipe joints to be joined, each joint having pin and box end portions with interengaged dovetail threaded portions that connect to similarly threaded portions of another joint and annular shoulders next to said threaded portions, and step "d" comprises observing the joints of pipe after assembly at the projection to determine whether or not the projection has marked the annular shoulder of the second joint of pipe to indicate a worn condition of the threads.

10. The method of claim 1 wherein step "a" comprises providing a pair of pipe joints to be joined, each joint having end portions with tapered shaped threaded portions that connect to similarly threaded portions of another joint.

11. The method of claim 1 wherein step "a" comprises providing a pair of pipe joints to be joined, each joint having end portions with wedge shaped threaded portions that connect to similarly threaded portions of another joint.

12. The method of claim 1 wherein step "a" comprises providing a pair of pipe joints to be joined, each joint having end portions with interlocking wedge shaped threaded portions that connect to similarly threaded portions of another joint, and each joint has an annular shoulder, said shoulders being spaced apart when said joints are assembled and said threaded portions are not overly worn.

13. A method of detecting thread wear for drill pipe and drill casing that are connectable end-to-end at threaded joint connections, comprising the steps of:
   a) providing a pair of pipe joints to be joined, each joint having end portions with threaded portions that connect to similarly threaded portions of another joint;
   b) placing a projection on a first of the pipe joints near the joint end portion, said projection facing a second pipe joint during assembly of a pair of pipe joints;
   c) connecting the joints of pipe together;
   d) observing the joints of pipe after assembly at the projection to determine whether or not one of the joints of pipe has become mechanically deformed at the projection, by the projection contacting the second joint to indicate a worn condition of the threads.

14. The method of claim 13 wherein in step "d" a worn thread condition is present if the projection extends to and engages the second joint of pipe.

15. The method of claim 13 wherein step "d" comprises observing the joints of pipe after assembly at the projection to determine whether or not the projection has scored the second joint of pipe to indicate a worn condition of the threads.

16. The method of claim 13 wherein step "b" comprises placing a metallic projection on a first of the pipe joints near the joint end portion, said metallic projection facing a second pipe joint during assembly of a pair of pipe joints.

17. The method of claim 13 wherein step "a" comprises providing a pair of pipe joints to be joined, each joint having end portions with threaded portions that connect to similarly threaded portions of another joint, said end portions including at least one end portion with a transverse flat face.

18. The method of claim 13 wherein step "a" comprises providing a pair of pipe joints to be joined, each joint having end portions with threaded portions that connect to similarly threaded portions of another joint, said end portions including at least one end portion with a transverse flat face, and step "d" comprises observing the joints of pipe after assembly at the projection to determine whether or not the projection has marked the second joint of pipe at the transverse face to indicate a worn condition of the threads.

19. The method of claim 13 further comprising the step of providing at least one of the joints of pipe with a flat annular surface at an end portion of the pipe joint and step "d" comprises observing the joints of pipe after assembly at the projection to determine whether or not the projection has marked the second joint of pipe at the flat annular surface to indicate a worn condition of the threads.

20. The method of claim 13 wherein step "a" comprises providing a pair of pipe joints to be joined, each joint having pin and box end portions with threaded portions that connect to similarly threaded portions of another joint.

21. The method of claim 13 wherein step "a" comprises providing a pair of pipe joints to be joined, each joint having pin and box end portions with interengaged dovetail threaded portions that connect to similarly threaded portions of another joint and annular shoulders next to said threaded portions, and step "d" comprises observing the joints of pipe after assembly at the projection to determine whether or not the projection has marked the annular shoulder of the second joint of pipe to indicate a worn condition of the threads.

22. The method of claim 13 wherein step "a" comprises providing a pair of pipe joints to be joined, each joint having end portions with tapered shaped threaded portions that connect to similarly threaded portions of another joint.

23. The method of claim 13 wherein step "a" comprises providing a pair of pipe joints to be joined each joint having end portions with wedge shaped threaded portions that connect to similarly threaded portions of another joint.

24. The method of claim 13 wherein step "a" comprises providing a pair of pipe joints to be joined, each joint having end portions with interlocking wedge shaped threaded portions that connect to similarly threaded portions of another joint, and each joint has an annular shoulder, said shoulders being spaced apart when said joints are assembled and said threaded portions are not overly worn.

* * * * *